(12) United States Patent
Ji et al.

(10) Patent No.: US 10,846,000 B2
(45) Date of Patent: Nov. 24, 2020

(54) GEOMETRY-AWARE COMMAND SCHEDULING

(71) Applicant: Western Digital Technologies, Inc., San Jose, CA (US)

(72) Inventors: YungLi Ji, Irvine, CA (US); Yun-Tzuo Lai, Irvine, CA (US); Haining Liu, Irvine, CA (US); Yuriy Pavlenko, Lake Forest, CA (US)

(73) Assignee: Western Digital Technologies, Inc., San Jose, CA (US)

( * ) Notice: Subject to any disclaimer, the term of this patent is extended or adjusted under 35 U.S.C. 154(b) by 0 days.

(21) Appl. No.: 16/455,577

(22) Filed: Jun. 27, 2019

(65) Prior Publication Data

US 2019/0317678 A1 Oct. 17, 2019

Related U.S. Application Data

(63) Continuation of application No. 15/677,941, filed on Aug. 15, 2017, now Pat. No. 10,379,765.

(60) Provisional application No. 62/525,682, filed on Jun. 27, 2017.

(51) Int. Cl.
| | |
|---|---|
| *G06F 3/06* | (2006.01) |
| *G06F 9/48* | (2006.01) |
| *G06F 12/02* | (2006.01) |
| *G06F 12/00* | (2006.01) |

(52) U.S. Cl.
CPC .......... *G06F 3/0623* (2013.01); *G06F 3/0611* (2013.01); *G06F 3/0652* (2013.01); *G06F 3/0653* (2013.01); *G06F 3/0659* (2013.01); *G06F 3/0679* (2013.01); *G06F 9/4881* (2013.01); *G06F 12/00* (2013.01); *G06F 12/0246* (2013.01); *G06F 2212/7202* (2013.01)

(58) Field of Classification Search
CPC ..................................................... G06F 9/4881
USPC ......................................................... 711/103
See application file for complete search history.

(56) References Cited

U.S. PATENT DOCUMENTS

| | | | |
|---|---|---|---|
| 2001/0028524 A1 | 10/2001 | Hoskins | |
| 2010/0250841 A1 | 9/2010 | Ikarashi | |
| 2012/0084484 A1 | 4/2012 | Post | |
| 2016/0162215 A1* | 6/2016 | Jayaraman | G06F 3/0688 711/103 |
| 2016/0239205 A1 | 8/2016 | Rothberg | |
| 2016/0357474 A1* | 12/2016 | Frid | G06F 3/0656 |
| 2017/0052734 A1* | 2/2017 | Kirchner | G06F 3/0608 |
| 2017/0123730 A1* | 5/2017 | Losh | G06F 3/067 |
| 2018/0143779 A1* | 5/2018 | Frid | G06F 3/0656 |

* cited by examiner

*Primary Examiner* — Than Nguyen
(74) *Attorney, Agent, or Firm* — Morgan, Lewis & Bockius LLP

(57) ABSTRACT

Command scheduling for die sets of non-volatile memory may be performed based on command states of the die sets. Upon receiving an erase command to erase data stored in a first block set of non-volatile memory, a command state of the first die set of the non-volatile memory is determined, where the first die set contains the first block set. If the first die set is determined to be in a pending command state, the erase command is queued in a wait queue. If the first die set is determined to be in an idle command state, the erase command is scheduled to erase the data stored in the first block set.

20 Claims, 6 Drawing Sheets

US 10,846,000 B2

GEOMETRY-AWARE COMMAND SCHEDULING

CROSS-REFERENCE TO RELATED APPLICATIONS

This application is a continuation of application Ser. No. 15/677,941, filed on Aug. 15, 2017, now U.S. Pat. No. 10,379,765, which claims the benefit of U.S. Provisional Application No. 62/525,682, filed on Jun. 27, 2017, the entirety of each of which is incorporated herein by reference for all purposes.

BACKGROUND

Data storage systems execute various types of commands such as write commands, read commands, and erase commands. Erase commands typically require a longer period of time to complete than write commands or read commands. Accordingly, erase commands may negatively impact latency of data access commands received from a host system.

SUMMARY

According to aspects of the subject disclosure, a processor-implemented method is provided. The method includes receiving an erase command to erase data stored in a first block set of a plurality of block sets of non-volatile memory and determining a command state of a first die set of a plurality of die sets of the non-volatile memory, where the first die set contains the first block set. If the first die set is determined to be in a pending command state, the erase command is queued in a wait queue. If the first die set is determined to be in an idle command state, the erase command is scheduled to erase the data stored in the first block set.

According to aspects of the subject disclosure, a processor-readable storage medium storing instructions that, when executed by a processor, perform a method is provided. The method includes receiving an erase command to erase data stored in a first block set of a plurality of block sets of non-volatile memory and determining a command state of a first die set of a plurality of die sets of the non-volatile memory, where the first die set contains the first block set. If the first die set is determined to be in a pending command state, the erase command is queued in a wait queue. If the first die set is determined to be in an idle command state, the erase command is scheduled to erase the data stored in the first block set.

According to aspects of the subject disclosure, a data storage system is provided. The data storage system includes a plurality of non-volatile memory die organized into a plurality of die sets arranged across a plurality of memory channels, where the plurality of non-volatile memory die contains a plurality of block sets. The data storage system further includes a controller configured to receive an erase command to erase data stored in a first block set of the plurality of block sets and determine a command state of a first die set of the plurality of die sets containing the first block set. If the first die set is determined to be in a pending command state, the erase command is queued in a wait queue. If the first die set is determined to be in an idle command state, the erase command is scheduled to erase the data stored in the first block set.

According to aspects of the subject disclosure, a data storage system is provided. The data storage system includes a plurality of non-volatile memory die organized into a plurality of die sets arranged across a plurality of memory channels, where the plurality of non-volatile memory die contains a plurality of block sets. The data storage system further includes means for receiving an erase command to erase data stored in a first block set of the plurality of block sets, means for determining a command state of a first die set of the plurality of die sets containing the first block set, means for queuing the erase command in a wait queue if the first die set is determined to be in a pending command state, and means for scheduling the erase command to erase the data stored in the first block set if the first die set is determined to be in an idle command state.

It is understood that other configurations of the subject disclosure will become readily apparent to those skilled in the art from the following detailed description, wherein various configurations of the subject disclosure are shown and described by way of illustration. As will be realized, the subject disclosure is capable of other and different configurations and its several details are capable of modification in various other respects, all without departing from the scope of the subject disclosure. Accordingly, the drawings and detailed description are to be regarded as illustrative in nature and not as restrictive.

DETAILED DESCRIPTION

The detailed description set forth below is intended as a description of various configurations of the subject disclosure and is not intended to represent the only configurations in which the subject disclosure may be practiced. The appended drawings are incorporated herein and constitute a part of the detailed description. The detailed description includes specific details for the purpose of providing a thorough understanding of the subject disclosure. However, it will be apparent to those skilled in the art that the subject disclosure may be practiced without these specific details. In some instances, structures and components are shown in block diagram form in order to avoid obscuring the concepts of the subject disclosure. Like components are labeled with identical element numbers for ease of understanding.

The subject technology is directed to geometry-aware command scheduling. More particularly, the subject technology is directed to systems and methods for scheduling erase commands based on a command state of a non-volatile memory device containing the memory location designated for erasure in the erase command. If the non-volatile memory device has a command pending for a different memory location in the non-volatile memory device, the requested erase command may be deferred to allow the pending command to complete before occupying the non-volatile memory device with execution of the erase command. Other aspects and features of the subject technology will become apparent based on the description provided below.

Figure 1:
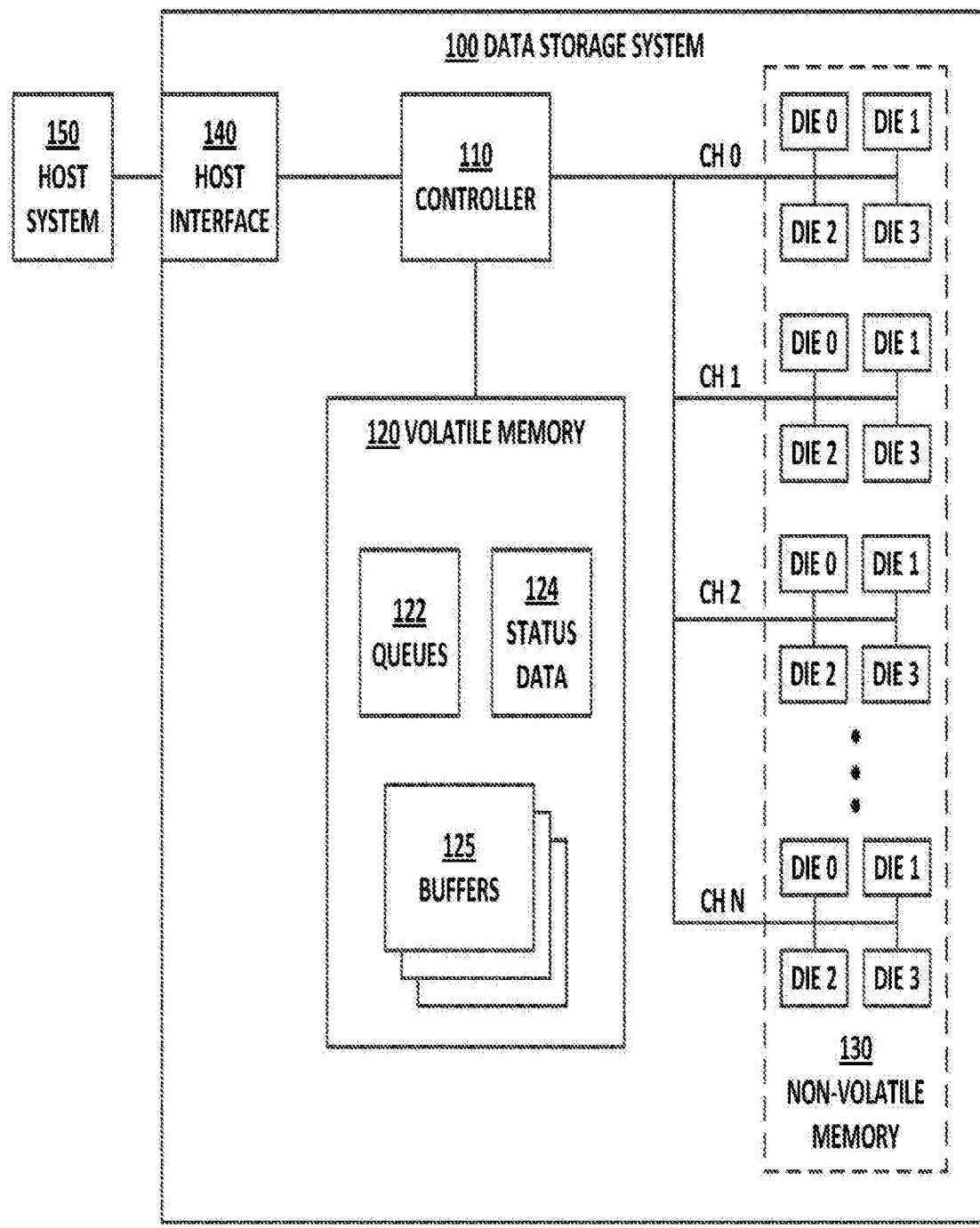
FIG. 1 is a block diagram illustrating components of a data storage system according to aspects of the subject disclosure.

FIG. 1 is a block diagram illustrating components of a data storage system 100 according to aspects of the subject technology. As depicted in FIG. 1, data storage system 100 includes controller 110, volatile memory 120, non-volatile memory 130, and host interface 140. Controller 110 is configured to process requests received from host system 150 via host interface 140 to access data in non-volatile memory 130. The data access requests received from host system 150 may include write requests to store host data in non-volatile memory 130, read requests to retrieve host data stored in non-volatile memory 130, and erase requests to erase host data stored in non-volatile memory 130. Other types of requests, such as status requests or device management requests, may be received from host system 150 and processed by controller 110.

Host interface 140 is configured to couple host system 150 to data storage system 100. Host interface 140 may include electrical and physical connections for operably coupling host system 150 to controller 110. Via the electrical and physical connections, host interface 140 is configured to communicate data, addresses, and control signals between host system 150 and controller 110. Controller 110 is configured to store host data received from host system 150 in non-volatile memory 130 in response to a write request received from host system 150, and to read host data stored in non-volatile memory 130 and to transfer the read host data to host system 150 via host interface 140 in response to a read request received from host system 150.

Host interface 140 may implement standard interfaces including, but not limited to, Serial Advanced Technology Attachment (SATA), Advanced Technology Attachment (ATA), Small Computer System Interface (SCSI), PCI-extended (PCI-X), Fibre Channel, Serial Attached SCSI (SAS), Secure Digital (SD), Embedded Multi-Media Card (EMMC), Universal Flash Storage (UFS) and Peripheral Component Interconnect Express (PCIe). However, the subject technology is not limited to the use of standard interfaces and may utilize custom or proprietary interfaces for communications with host system 150.

Host system 150 represents any device configured to be coupled to and communicate with data storage system 100 via host interface 140 to store and retrieve data in data storage system 100. Host system 150 may be a computing device such as a personal computer, a server, a workstation, a laptop computer, a smart phone, and the like. Alternatively, host system 150 may be an electronic device such as a digital camera, a digital audio player, a digital video recorder, and the like.

Controller 110 is configured to monitor and control the operation of the components of data storage system 100 in response to requests received from host system 150 and during execution of internal maintenance operations. Controller 110 may include a multi-core processor, a general-purpose microprocessor, a microcontroller, a digital signal processor (DSP), an application specific integrated circuit (ASIC), a field programmable gate array (FPGA), a programmable logic device (PLD), a state machine, gated logic, discrete hardware components, or a combination of the foregoing. In some aspects, one or more components of controller 110 may be integrated into a single chip or module, or may be implemented in two or more discrete chips or modules.

Volatile memory 120 represents memory used by controller 110 to temporarily store data and information used to manage data storage system 100. For example, controller 110 may use volatile memory to store queues 122 for pending commands, status data 124 to track command states of non-volatile memory 130, and buffers 125 for host data waiting to be written to non-volatile memory 130 or host data read from non-volatile memory 130 waiting to be transferred to host system 150 or written back to non-volatile memory 130. Controller 110 also may store various types of system data used in the management of data storage system 100 in volatile memory 120. The system data may include tables mapping logical addresses referenced by host system 150 to physical addresses of non-volatile memory 130, program/erase (P/E) cycle counts, error statistics, valid/invalid data counts, etc. Controller 110 may store some or all of the data and information described above in non-volatile memory 130, or another form of non-volatile memory not shown, so as to preserve the data and information when data storage system 100 is shut down or otherwise loses power. Controller 110 may periodically store copies of the data and information in non-volatile memory 130 or may wait for a shutdown or power-loss event to back up the data and information in non-volatile memory 130.

Volatile memory 120 may be a random-access memory (RAM) such as static RAM (SRAM) or dynamic RAM (DRAM). However, the subject technology is not limited to any particular type of RAM. In addition, volatile memory 120 may be implemented using a single RAM module or multiple RAM modules. While volatile memory 120 is depicted as being distinct from controller 110, portions or all of volatile memory 120 may be incorporated into controller 110.

As depicted in FIG. 1, non-volatile memory 130 may include multiple flash memory die arranged among multiple channels. For example, FIG. 1 illustrates each of N channels having four flash memory die (die 0-3). Four die are depicted for each channel, however, the subject technology is not limited to this configuration and may utilize any number of flash memory die arranged in each channel. Each die may include an array of non-volatile memory cells, such as NAND flash memory cells, where each cell may be used to store one or more bits of data. For example, the flash memory die may be configured to store one bit of data per cell in a single-level cell (SLC) configuration, two bits of data per cell in a multi-level cell (MLC) configuration, three bits per cell in a three-level cell (TLC) configuration, four bits per cell in a quad-level cell (QLC) configuration, etc. Die 0-3 in each of flash memory channels 0-N may be implemented in respective chips or packages. Alternatively, two or more die may be integrated into single chips or packages.

Controller 110 is configured to communicate commands, control information, addresses, data, etc. with the flash memory die via the respective flash memory channels 0-N. Each channel may represent one or more buses configured to communicate electrical signals encoded with commands, control information, addresses, and/or data between controller 110 and the flash memory die coupled to the respective flash memory channel. The subject technology is not limited to any particular number of flash memory channels. For example, data storage system 100 may include 8 channels, 16 channels, 32 channels, etc., without departing from the scope of the subject technology.

Figure 2:
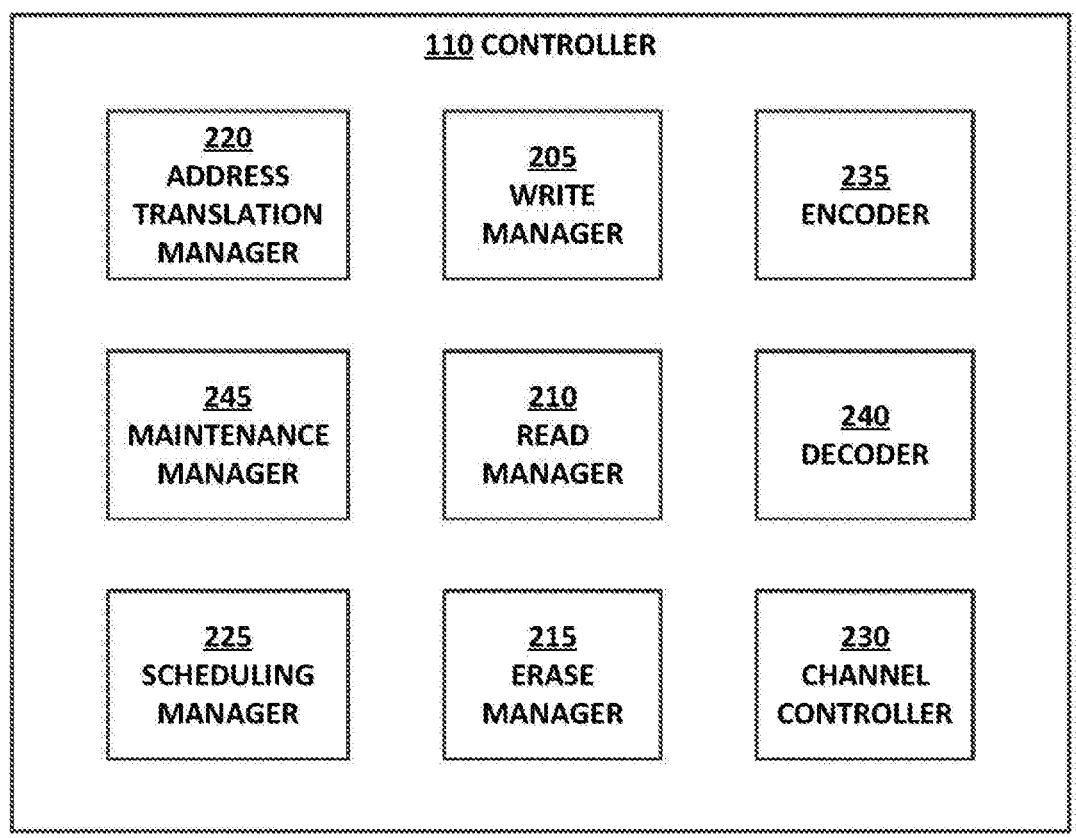
FIG. 2 is a block diagram illustrating internal components of a controller according to aspects of the subject technology.

Controller 110 includes internal components that play respective roles in the operation of data storage system 100. FIG. 2 is a block diagram illustrating internal components of controller 110 according to aspects of the subject technology. As depicted in FIG. 2, controller 110 includes write manager 205, read manager 210, and erase manager 215. Each of these managers is configured to manage the processing of write commands, read commands, and erase commands, respectively, within data storage system 100. Write, read, and erase commands may be based on requests received from host system 150 or may be generated by internal management processes executing within controller 110.

Data storage system 100 presents a logical data interface to host system 150 in which host data written to data storage system 100 is referenced by host system 150 using logical addresses, such as logical block addresses. Address translation manager 220 within controller 110 maps the logical addresses provided by host system 150 to physical addresses of locations within non-volatile memory 130 to which host data is written. Address translation manager 220 maintains tables or other types of data structures in volatile memory 120, for example, that map the logical addresses to the corresponding physical addresses. This mapping of logical addresses to physical addresses provides a layer of abstraction allowing controller 110 to manage the storage of host data stored within non-volatile memory 130 independent of host system 150.

Write manager 205, read manager 210, and erase manager 215 are configured to notify scheduling manager 225 when commands are ready to be issued to non-volatile memory 130. As will be described in further detail below, scheduling manager 225 may determine the command state of the flash memory die to which the commands are to be issued and either schedule the command for execution or queue the command in a wait queue based on the determined command state. Using the processes and algorithms described herein, scheduling manager 225 is configured to schedule commands for issuance and execution in manner to reduce the impact on latency experienced by host system 150 when issuing requests to data storage system 100.

Scheduling manager 225 may be configured to issue commands to non-volatile memory 130 by notifying channel controller 230 about the command or transferring the command to channel controller 230. Channel controller 230 may include a queue for commands to be issued to flash memory die in respective channels and may communicate the commands to the flash memory die using the one or more buses of the flash memory channels. Commands may be issued from the queues to respective flash memory die when the flash memory die becomes available for a next command, for example, when the command state of the flash memory die is in an idle command state. The subject technology is not limited to the single channel controller 230 depicted in FIG. 2. For example, each of flash memory channels 0-N may be coupled to a respective flash memory controller 230 implemented within controller 110.

Controller 110 also may include encoder 235 and decoder 240 for encoding data prior to writing the data to non-volatile memory 130 and decoding encoded data read from non-volatile memory 130. Encoder 235 and decoder 240 may utilize an error-correction code (ECC) scheme to correct data errors that occur when storing data in non-volatile memory. The subject technology is not limited to any particular ECC scheme and may implement a low-density parity check (LDPC) scheme, for example. Decoder 240 may implement both hard-decision decoding and soft-decision decoding. In addition, multiple instances of encoder 235 and decoder 240 may be implemented within controller 110. For example, each of the flash memory channels may have respective encoders 235 and decoders 240 allocated for writing and reading data to flash memory die in the respective flash memory channel.

Maintenance manager 245 is configured to monitor the operation and state of non-volatile memory 130 and perform background maintenance operations to maintain the health and performance of data storage system 100. For example, maintenance manager 245 may perform garbage collection operations to free up memory space within non-volatile memory 130 as needed, wear-leveling operations to help manage the amount of wear experienced across the flash memory die, and data-relocations operations to move data from high-risk locations within non-volatile memory 130 to lower risk locations. Each of these types of maintenance operations may involve a number of read operations, write operations, and erase operations. Maintenance manager 245 may forward these operations to the respective write manager 205, read manager 210, or erase manager 215 for processing, or may notify scheduling manager 225 directly to request scheduling of the respective commands for these operations.

The components of controller 110 each may be implemented using one or more sequences of instructions (e.g., software/firmware) loaded and executed by a processor or processor core, using hardware logic circuits, or a combination of hardware and software/firmware. For example, in a controller 110 that includes multiple processors or a multi-core processor, individual processors or processor cores may be assigned to provide the functionality of respective components of controller 110. Furthermore, one or more of the components discussed above may be implemented outside of controller 110 without departing from the scope of the subject technology.

Figure 3:
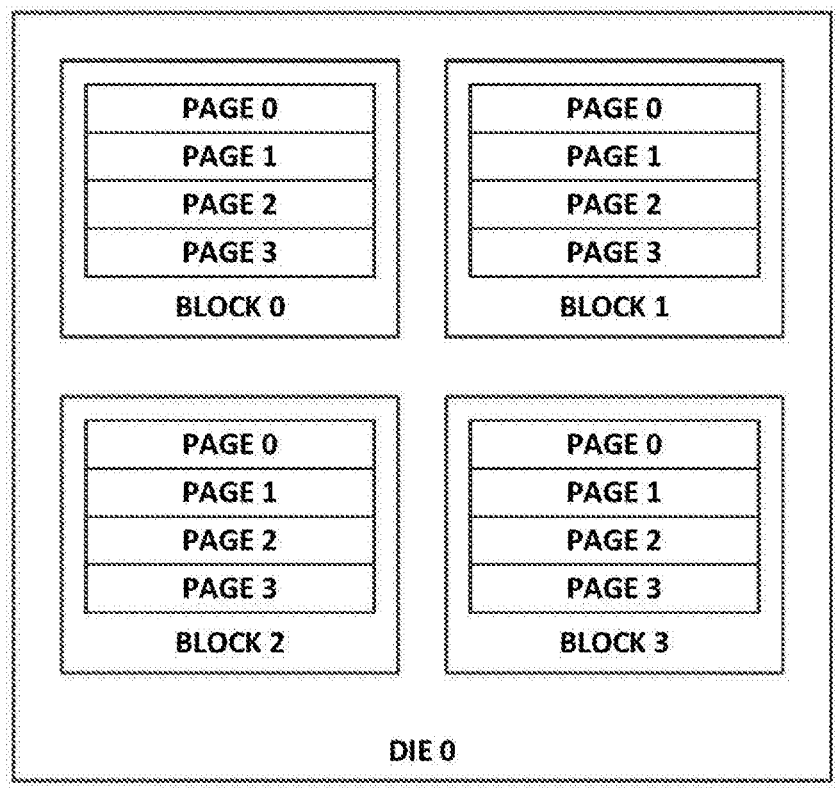
FIG. 3 illustrates a configuration of a flash memory die according to aspects of the subject technology.

FIG. 3 illustrates a configuration of a flash memory die according to aspects of the subject technology. The flash memory cells of a die may be arranged in physical blocks, with each block containing multiple worldliness or pages. For example, FIG. 3 illustrates flash memory die 0 containing four physical blocks 0-3, with each physical block containing four pages 0-3. Each page or wordline includes multiple memory cells (e.g., 1 k, 2 k, 4 k, etc.) and in NAND flash represents the smallest unit available for writing data to the die or reading data stored in the die. Depending on the number of bits stored per cell, multiple logical pages of data may be stored in each page or wordline. For example, in MLC flash memory two logical pages may be stored in each page or wordline, and in TLC flash memory up to three logical pages may be stored in each page or wordline.

FIG. 3 depicts each of blocks 0 to 3 as containing four pages or wordlines. The subject technology is not limited to any particular number of pages or wordlines in each physical block. For example, each block may contain 8 pages/wordlines, 16 pages/wordlines, 32 pages/wordlines, etc. Furthermore, the number of physical blocks contained in each flash memory die is not limited to the four blocks depicted in FIG. 3. In NAND flash memory, the physical block represents the smallest unit available for erasing data in the flash memory die.

According to aspects of the subject technology, the flash memory die and physical blocks may be organized into logical units. For example, the flash memory die may be organized into die sets, where each die set includes a die from each of the flash memory channels. Referring back to FIG. 1, one die set may include die 0 from each of flash memory channels 0-N. Each die set may not include the same number of flash memory die as some flash memory die may be removed from use by controller 110 due to error rates or other failure signals experienced during operation of data storage system 100.

Similarly, the physical blocks may be organized into block sets, where each block set includes a physical block from each flash memory die in a particular die set. For example, within the die set comprising die 0 from each of the flash memory channels, a first block set may include block 0 from each die 0, a second block set may include block 1 from each die 0, etc. Each physical block of a particular block set may have the same physical address within the respective flash memory die assigned to the physical block. The physical blocks may be uniquely identified using the physical block address, an identifier for the die containing the physical block, and an identifier for the flash memory channel coupled to the die.

Controller 110 may be configured to write pages of data sequentially across the block sets. For a given group of data pages, controller 110 may write one data page to each block of a block set in a first set of write operations. Controller 110 may then write another data page to each block of the block set in a second set of write operations. Controller 110 may repeat these write operations until all pages in the block set have been written to, after which controller 110 selects a next block set for subsequent write operations.

Controller 110 may implement a redundant array of independent disks (RAID) storage scheme to further maintain data integrity within data storage system 100. According to aspects of the subject technology, as data pages are scheduled for being written to non-volatile memory 130, the data pages are temporarily stored in a write buffer (e.g., buffers 125). The write buffer may have respective storage locations for the data pages and a storage location for parity data generated based on the data pages stored in the write buffer. The total number of storage locations in the write buffer may correspond to the number of physical blocks in each block set. In a configuration in which there are eight flash memory channels used to provide block sets containing eight physical blocks, one physical block per respective die in the eight flash memory channels, the write buffer may include eight storage locations. Seven of the storage locations may be used to store data pages and one of the storage locations may be used to store the generated parity data. The parity data may be generated using an XOR logic operation on the data pages stored in the seven storage locations, but the subject technology is not limited to this configuration.

The number of write buffers available is limited. For example, controller 110 may be configured to use four write buffers. As data pages are received for writing to non-volatile memory 130, the logical addresses associated with the data is mapped to a physical address within a block/block set to which the data pages are intended to be written and identifiers are assigned to the data pages. The data pages are written to a write buffer while they await processing. Once the write buffer is full of data pages and parity data has been generated, write commands for writing the data pages and the parity data to a designated block set are scheduled by the scheduling manager 225. Controller 110 utilizes a number of identifiers for assignment to data pages corresponding to the number of storage locations across the write buffers. Once all of the identifiers have been assigned to data pages when all of the write buffers are full, no more data pages may be processed for writing to non-volatile memory 130 until the data pages and parity data in at least one of the write buffers has been written to non-volatile memory 130 and the write buffer has been cleared thereby freeing up identifiers for subsequent data pages to be scheduled for writing to non-volatile memory 130.

Erase commands may take significantly longer to execute than write or read commands. For example, an erase command may require 20 ms to complete while a write command may complete in 1.5 ms. These times represent examples for discussion purposes and are not intended to characterize all erase and write commands. Physical blocks may be erased individually or as a block set. If a die or die set is executing an erase command to erase one or more physical blocks, the die or die set may be unavailable to execute other commands, such as write commands. Accordingly, the die or die set may delay writing data pages to another block or block set in the die or die set until the erase command has completed and halt the processing of data pages for writing to non-volatile memory 130. This delay may negatively impact the latency observed by host system 150 reducing the throughput or other performance factors of data storage system 100.

According to aspects of the subject technology, controller 110 utilizes a geometry-aware scheduling algorithm to schedule erase commands for execution in non-volatile memory 130. In the context of the subject technology, geometry refers to the arrangement of physical blocks within the flash memory die and the arrangement of the flash memory die among the flash memory channels. Controller 110 utilizes an awareness of the command state of die or die sets within non-volatile memory 130 when scheduling commands such as erase commands. The command state may be an idle command state in which the die or die set has no pending or in-process commands designed for physical blocks within the die or die set. Alternatively, the command state may be a pending command state in which one or more commands are scheduled or in process for physical blocks within the die or die set. Controller 110 may utilize status data (e.g., status data 124) to maintain awareness of the command states of the die or die sets within non-volatile memory 130.

According to aspects of the subject technology, status data 124 may include a data structure comprises of one or more bits associated with each of the respective die or die sets within non-volatile memory 130. The one or more bits may be initialized by controller 110 to a first value to reflect an idle command state when data storage system 100 is powered on or reset. Controller 110 may set the one or more bits for respective die or die sets to a second value to reflect a pending command state upon scheduling a write command or a read command for execution in a block or block set within the respective die or die set. The one or more bits may be reset to reflect the idle command state if there are no write commands with data pages stored in the write buffers awaiting scheduling.

Figure 4:
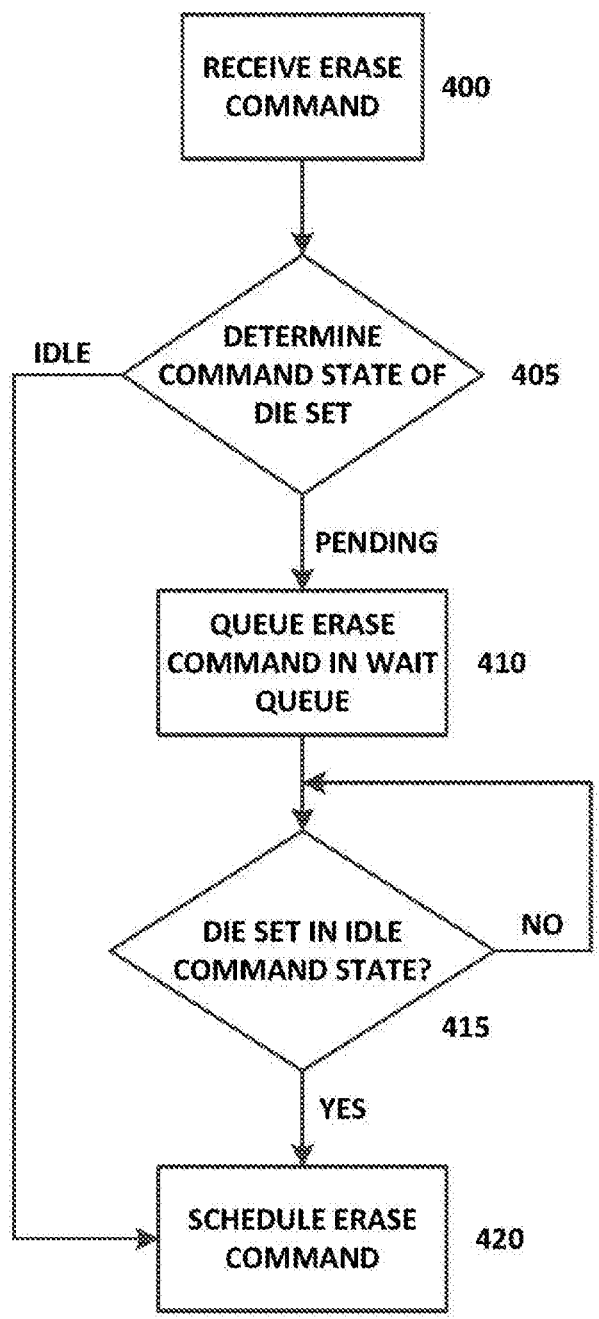
FIG. 4 is a flowchart illustrating a process of geometry-aware erase scheduling according to aspects of the subject technology.

FIG. 4 is a flowchart illustrating a process of geometry-aware erase scheduling according to aspects of the subject technology. Briefly, the process includes receiving an erase command for scheduling (block 400) and determining the command state of the die set containing the block designated for erasure in the erase command (block 405). If the command sate of the die set is in a pending command state, the erase command is queued in a wait queue (block 410) until it is determined that the command state of the die set has been set to the idle command state (block 415). Once the command state of the die set is determined to be in the idle command state (block 405 or block 415), the erase command is scheduled for execution (block 420).

As noted above, scheduling manager 225 may receive a request to schedule an erase command (block 400). The request may come from erase manager 215 or maintenance manager 245, for example. The erase command may include a physical address identifying the block set and die set containing the block set for execution of the erase command. Using an identifier associated with the die set derived from the physical address of the erase command, scheduling manager 225 determines the command state of the die set (block 405). For example, status data 124 may be indexed using die set identifiers. Using the die set identifier derived from the physical address of the erase command, scheduling manager 225 may look up the one or more bits indexed by the die set identifier to determine the command state of the die set.

If the one or more bits in the status data 124 indicate the die set is in a pending command state, scheduling manager 225 queues the erase command in a wait queue (e.g., queue 122) to defer scheduling the erase command until the die set has completed execution of the write or read commands scheduled for a block set contained within the die set. For example, upon buffering data pages in a write buffer, the status data corresponding to the die set containing the block set to which the data pages are intended to be written is set to indicate a pending command state. While the erase command is queued in the wait queue, scheduling manager 225 periodically checks the command state of the die set in status data 124 to determine if an idle command state has been set for the die set (block 415).

When scheduling manager 225 determines that the command state for the die set identified in the erase command has been set to the idle command state, scheduling manager 225 schedules the erase command for execution by sending the command to channel controller 230 for execution (block 420). This determination by scheduling manager 225 may occur when the request for the erase command is first received by scheduling manager 225 (block 405) or after the erase command has been placed on the wait queue to allow pending write or read commands to complete processing.

The blocks of the flowchart illustrated in FIG. 4 have been described as occurring sequentially. The subject technology is not limited to the described sequential performance of the illustrated process. One or more of the blocks may be performed in parallel with other blocks in the illustrated process. For example, the determination of whether the command state of a die state is set to an idle command state (block 415) may be performed as a parallel process while subsequent erase commands are received and processed according to the illustrated process. Other variations in the illustrated process are within the scope of the subject technology.

Figure 5:
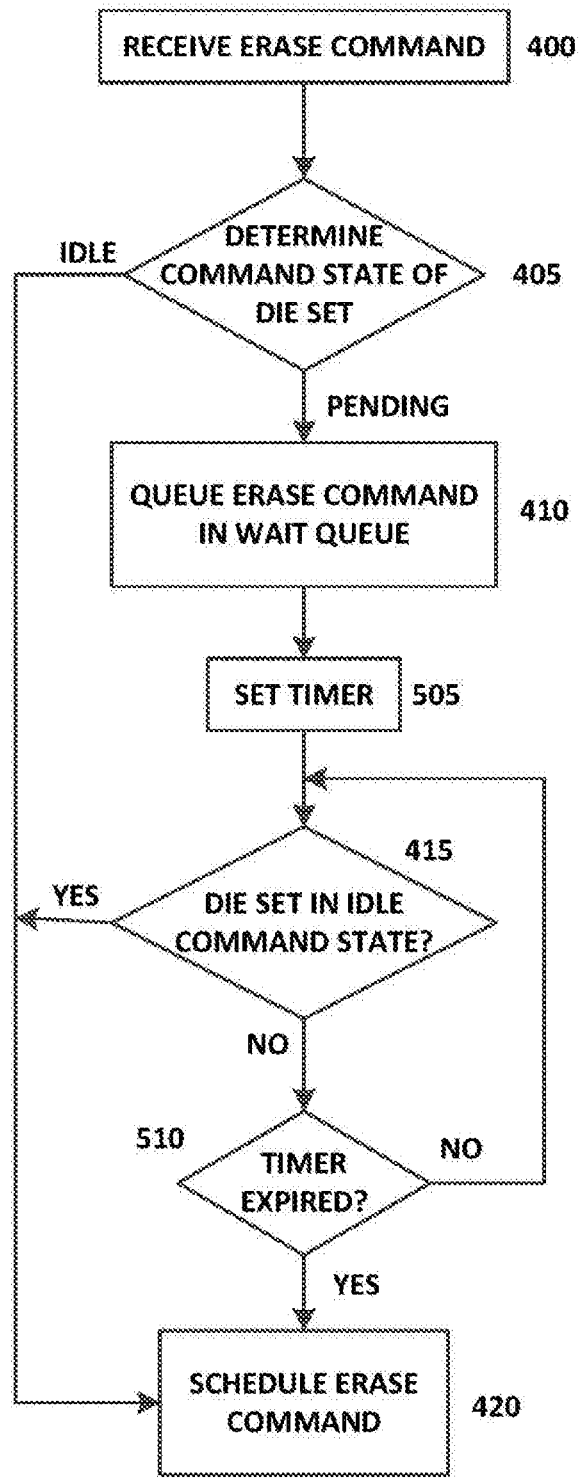
FIG. 5 is a flowchart illustrating another process of geometry-aware erase scheduling according to aspects of the subject technology.

FIG. 5 is a flowchart illustrating another process of geometry-aware erase scheduling according to aspects of the subject technology. Blocks 400 to 420 in FIG. 5 correspond to the blocks of the same numbers in FIG. 4 and will not be described in detail again with respect to FIG. 5. The process illustrated in FIG. 5 combines the use of a timer with the geometry-aware scheduling discussed above with respect to FIG. 4, as described in more detail below.

Upon queuing an erase command in a wait queue in response to determining the die set containing the block set specified for erasure in the erase command is in a pending command state (block 410), scheduling manager 225 may initiate or start a timer in connection with the queued erase command (block 505). If the command state of the die set remains in the pending command state when the timer has expired (block 510), scheduling manager 225 proceeds with scheduling the erase command (block 420) for the block set be sending the erase command to channel controller 230 for execution. Channel controller 230 may issue the erase command to the die set upon completion of a current command being executed in the die set even if other write or read commands remain pending for the die set. The duration of the timer may be set for a period of time long enough to allow some number of write or read commands (e.g., two, three, four, etc.) to complete before forcing the scheduling of the erase command. Erase commands are important to the operation of data storage system 100 as erase commands are used to free up block sets for future write operations in connection with garbage collection operations. Delaying erase commands too long may allow the number of available block sets to drop below a threshold count and potentially impact the performance of data storage system 100. The timer variation on the erase scheduling process provides a compromise between increasing latency experienced by host system 150 due to erase command execution and maintaining the performance health of data storage system 100 by providing an override to the scheduling algorithm to allow erase commands to be executed in a busy system.

Figure 6:
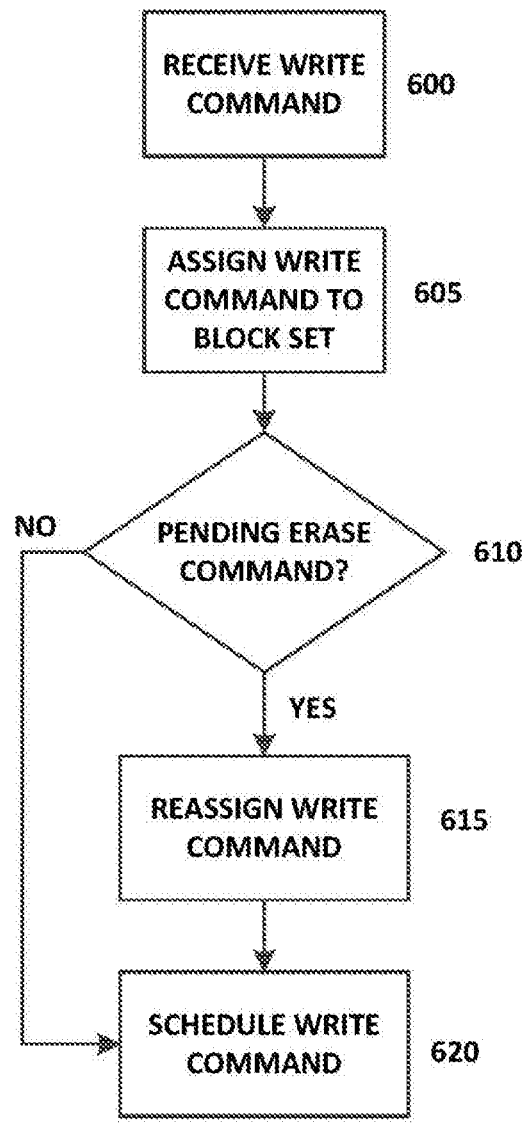
FIG. 6 is a flowchart illustrating a process for scheduling write commands according to aspects of the subject technology.

The description above focused on the scheduling of erase commands in data storage system 100. According to aspects of the subject technology, write commands may be modified based on pending erase commands. FIG. 6 is a flowchart illustrating a process for scheduling write commands according to aspects of the subject technology.

Upon receiving a write command for scheduling (block 600), the write command may be assigned to the next available block set for writing the data associated with the command (block 605). After the write command has been assigned to a block set, scheduling manager 225 may determine if a die set containing a block set associated with the write command has a pending erase command scheduled (block 610). If the die set has a pending erase command scheduled, scheduling manager 225 or write manager 205 may re-assign the write command to write the data associated with the write command to a block set in a different die set (block 615). The write command is then scheduled for execution to the new block set if the write command was reassigned, or the originally assigned block set if there was not pending erase command (block 620). In this manner, the write command is not delayed while waiting for the erase command to complete execution in the original die set. The re-assignment may be performed by remapping the logical block address provided by host system 150 to identify the data to a new physical address in non-volatile memory 130.

Aspects of the subject technology provide a processor-implemented method that includes receiving an erase command to erase data stored in a first block set of a plurality of block sets of non-volatile memory and determining a command state of a first die set of a plurality of die sets of the non-volatile memory, the first die set containing the first block set. If the first die set is determined to be in a pending command state, the erase command is queued in a wait queue. If the first die set is determined to be in an idle command state, the erase command is scheduled to erase the data stored in the first block set.

The processor-implemented method may further include monitoring the command state of the first die set if the first die set is determined to be in the pending command state and determining the command state of the first die set has changed from the pending command state to the idle command state. In response to determining the command state of the first die set has changed to the idle command state, the erase command queued in the wait queue is scheduled to erase the data stored in the first block set.

The processor-implemented method may further include receiving a write command assigned to a second block set in the first die set while the scheduled erase command is pending for the first block set and re-assigning the write command to a third block set in a second die set different from the first die set. The re-assigned write command is then scheduled for execution.

The processor-implemented method may include starting a timer upon queueing the erase command in the wait queue and monitoring the command state of the first die set. The method may determine the timer has expired with the erase command queued in the wait queue and the first die set remaining in the pending command state and schedule the erase command queued in the wait queue while the first die set remains in the pending command state in response to determining the timer has expired.

According to aspects of the processor-implemented method, determining the command state of the first die set may comprise determining whether a bit corresponding to the first die set is set in a status data set. In addition, each die set of the plurality of die sets may comprise a respective die in each of a plurality of memory channels of the non-volatile memory, and each block set of the plurality of block sets may comprise a respective memory block in each die of a respective die set of the plurality of die sets.

Aspects of the subject technology may provide a processor-readable storage medium storing instructions that, when executed by a processor, perform a method. The method may include receiving an erase command to erase data stored in a first block set of a plurality of block sets of non-volatile memory, and determining a command state of a first die set of a plurality of die sets of the non-volatile memory, the first die set containing the first block set. If the first die set is determined to be in a pending command state, the erase command is queued in a wait queue. If the first die set is determined to be in an idle command state, the erase command is scheduled to erase the data stored in the first block set.

The method may further include monitoring the command state of the first die set if the first die set is determined to be in the pending command state and determining the command state of the first die set has changed from the pending command state to the idle command state. In response to determining the command state of the first die set has changed to the idle command state, the erase command queued in the wait queue is scheduled to erase the data stored in the first block set.

The method may further include receiving a write command assigned to a second block set in the first die set while the scheduled erase command is pending for the first block set and re-assigning the write command to a third block set in a second die set different from the first die set. The re-assigned write command is then scheduled for execution.

The method may include starting a timer upon queueing the erase command in the wait queue and monitoring the command state of the first die set. The method may determine the timer has expired with the erase command queued in the wait queue and the first die set remaining in the pending command state and schedule the erase command queued in the wait queue while the first die set remains in the pending command state in response to determining the timer has expired.

Aspects of the subject technology may provide a data storage system that includes a plurality of non-volatile memory die organized into a plurality of die sets arranged across a plurality of memory channels, wherein the plurality of non-volatile memory die contains a plurality of block sets. The data storage system further includes a controller configured to receive an erase command to erase data stored in a first block set of the plurality of block sets and determine a command state of a first die set of the plurality of die sets containing the first block set. If the first die set is determined to be in a pending command state, the erase command is queued in a wait queue. If the first die set is determined to be in an idle command state, the erase command is scheduled to erase the data stored in the first block set.

The controller may be configured to monitor the command state of the first die set if the first die set is determined to be in the pending command state and determine the command state of the first die set has changed from the pending command state to the idle command state. In response to determining the command state of the first die set has changed to the idle command state, the erase command queued in the wait queue may be scheduled to erase the data stored in the first block set.

The controller may be configured to receive a write command assigned to a second block set in the first die set while the scheduled erase command is pending for the first block set and re-assign the write command to a third block set in a second die set different from the first die set. The re-assigned write command is then scheduled for execution.

The controller may be configured to start a timer upon queuing the erase command in the wait queue, monitor the command state of the first die set, and determine the timer has expired with the erase command queued in the wait queue and the first die set remaining in the pending command state. In response to determining that the timer has expired, the erase command queued in the wait queue is scheduled for execution while the first die set remains in the pending command state.

Determining the command state of the first die set may include determining whether a bit corresponding to the first die set is set in a status data set. Each die set of the plurality of die sets may include a respective die in each of the plurality of memory channels of the non-volatile memory, and each block set of the plurality of block sets may include a respective memory block in each die of a respective die set of the plurality of die sets.

Aspects of the subject technology may provide a data storage system that includes a plurality of non-volatile memory die organized into a plurality of die sets arranged across a plurality of memory channels, wherein the plurality of non-volatile memory die contains a plurality of block sets. The data storage system may further include means for receiving an erase command to erase data stored in a first block set of the plurality of block sets, means for determining a command state of a first die set of the plurality of die sets containing the first block set, means for queuing the erase command in a wait queue if the first die set is determined to be in a pending command state, and means for scheduling the erase command to erase the data stored in the first block set if the first die set is determined to be in an idle command state.

The data storage system may include means for monitoring the command state of the first die set if the first die set is determined to be in the pending command state, means for determining the command state of the first die set has changed from the pending command state to the idle command state, and means for scheduling the erase command queued in the wait queue to erase the data stored in the first block set in response to determining the command state of the first die set has changed to the idle command state.

The data storage system may include means for receiving a write command assigned to a second block set in the first die set while the scheduled erase command is pending for the first block set, means for re-assigning the write command to a third block set in a second die set different from the first die set, and means for scheduling the write command.

The data storage system may include means for starting a timer upon queuing the erase command in the wait queue, means for monitoring the command state of the first die set, means for determining the timer has expired with the erase command queued in the wait queue and the first die set remaining in the pending command state, and means for scheduling the erase command queued in the wait queue while the first die set remains in the pending command state in response to determining the timer has expired.

Many of the above-described features of example process and related features and applications, may be implemented as software or firmware processes that are specified as a set of instructions recorded on a processor-readable storage medium (also referred to as computer-readable medium). When these instructions are executed by one or more processing unit(s) (e.g., one or more processors, cores of processors, or other processing units), the processing unit(s) are caused to perform the actions indicated in the instructions. Examples of processor-readable media include, but are not limited to, volatile memory 120, non-volatile memory 130, as well as other forms of media such as magnetic media, optical media, and electronic media. The processor-readable media does not include carrier waves and electronic signals communicated wirelessly or over wired connections.

The term "software" is meant to include, where appropriate, firmware residing in memory or applications stored in memory, which may be read into a working memory for processing by a processor. Also, in some implementations, multiple software aspects of the subject disclosure may be implemented as sub-parts of a larger program while remaining distinct software aspects of the subject disclosure. In some implementations, multiple software aspects may also be implemented as separate programs. Finally, any combination of separate programs that together implement a software aspect described here is within the scope of the subject disclosure. In some implementations, the software programs, when installed to operate on one or more electronic systems, define one or more specific machine implementations that execute and perform the operations of the software programs.

A computer program (also known as a program, software, software application, script, or code) may be written in any form of programming language, including compiled or interpreted languages, declarative or procedural languages, and it may be deployed in any form, including as a stand-alone program or as a module, component, subroutine, object, or other unit suitable for use in a computing environment. A computer program may, but need not, correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code).

It is understood that illustrative blocks, modules, elements, components, methods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or partitioned in a different way) all without departing from the scope of the subject disclosure.

It is understood that the specific order or hierarchy of steps in the processes disclosed is presented as an illustration of some exemplary approaches. Based upon design preferences and/or other considerations, it is understood that the specific order or hierarchy of steps in the processes may be rearranged. For example, in some implementations some of the steps may be performed simultaneously. Thus the accompanying method claims present elements of the various steps in a sample order, and are not meant to be limited to the specific order or hierarchy presented.

The previous description is provided to enable any person skilled in the art to practice the various aspects described herein. The previous description provides various examples of the subject disclosure, and the subject disclosure is not limited to these examples. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

The predicate words "configured to", "operable to", and "programmed to" do not imply any particular tangible or intangible modification of a subject, but, rather, are intended to be used interchangeably. For example, a processor configured to monitor and control an operation or a component may also mean the processor being programmed to monitor and control the operation or the processor being operable to monitor and control the operation. Likewise, a processor configured to execute code may be construed as a processor programmed to execute code or operable to execute code.

The phrases "in communication with" and "coupled" mean in direct communication with or in indirect communication with via one or more components named or unnamed herein (e.g., a memory card reader)

A phrase such as an "aspect" does not imply that such aspect is essential to the subject disclosure or that such aspect applies to all configurations of the subject disclosure. A disclosure relating to an aspect may apply to all configurations, or one or more configurations. An aspect may provide one or more examples. A phrase such as an aspect may refer to one or more aspects and vice versa. A phrase such as an "implementation" does not imply that such implementation is essential to the subject disclosure or that such implementation applies to all configurations of the subject disclosure. A disclosure relating to an implementation may apply to all aspects, or one or more aspects. An implementation may provide one or more examples. A phrase such as an "implementation" may refer to one or more implementations and vice versa. A phrase such as a "configuration" does not imply that such configuration is essential to the subject disclosure or that such configuration applies to all configurations of the subject disclosure. A disclosure relating to a configuration may apply to all configurations, or one or more configurations. A configuration may provide one or more examples. A phrase such as a "configuration" may refer to one or more configurations and vice versa.

The word "exemplary" is used to mean "serving as an example or illustration." Any aspect or design described herein as "exemplary" is not necessarily to be construed as preferred or advantageous over other aspects or designs.

What is claimed is:

1. A storage system, comprising:
   a memory organized into a plurality of memory sets, wherein a first memory set of the plurality of memory sets comprises a first memory portion; and
   a controller configured to:
     determine a command state of the first memory set;
     queue an erase command to erase data stored in the first memory portion, when the first memory set is in a pending command state; and
     schedule the erase command for execution to erase the data stored in the first memory portion, when a timer for the erase command has expired, and the first memory set remains in the pending command state.

2. The storage system of claim 1, wherein the controller is configured to:
   assign a write command, to a second memory portion of a plurality of memory portions of the memory, for writing data associated with the write command, wherein the first memory set comprises the first memory portion and the second memory portion;
   when the scheduled erase command is pending for the first memory portion, re-assign the write command to write the data associated with the write command, to a memory portion in a second memory set of the plurality of memory sets, wherein the second memory set is different from the first memory set; and
   schedule the write command to write the data associated with the write command.

3. The storage system of claim 2, wherein the controller is configured to:
   when the scheduled erase command is not pending for the first memory portion, schedule the write command using the second memory portion in the first memory set, to write the data associated with the write command; and
   when the scheduled erase command is pending for the first memory portion, schedule the write command using the memory portion in the second memory set, to write the data associated with the write command.

4. The storage system of claim 1, wherein the controller is configured to:
   monitor the command state of the first memory set when the first memory set is determined to be in the pending command state; and
   schedule the erase command queued in a wait queue to erase the data stored in the first memory portion, when the command state of the first memory set is changed from the pending command state to an idle command state.

5. The storage system of claim 1, wherein the controller is configured to:
   when the first memory set is determined to be in an idle command state, schedule the erase command to erase the data stored in the first memory portion.

6. The storage system of claim 1, wherein the controller configured to determine the command state of the first memory set comprises the controller configured to determine whether a bit corresponding to the first memory set is set in a status data set.

7. The storage system of claim 1, wherein a plurality of memory portions comprises the first memory portion, wherein the first memory set comprises the plurality of memory portions, wherein each memory set of the plurality of memory sets comprises a respective die in a respective one of a plurality of memory channels of the memory, and wherein each memory portion of the plurality of memory portions comprises a respective memory block in a respective die.

8. A machine-implemented method, comprising:
   determining a command state of a first memory set of a plurality of memory sets of a memory, wherein the first memory set comprises a first memory portion;
   queuing an erase command to erase data stored in the first memory portion of a plurality of memory portions of the memory, when the first memory set is in a pending command state; and
   scheduling the erase command to erase the data stored in the first memory portion, when a timer for the erase command has expired, and the first memory set remains in the pending command state.

9. The machine-implemented method of claim 8, comprising:
   assigning a write command to a second memory portion of the plurality of memory portions for writing data associated with the write command, wherein the first memory set comprises the first memory portion and the second memory portion;
   when the scheduled erase command is pending for the first memory portion, re-assigning the write command to write the data associated with the write command, to a memory portion in a second memory set of the plurality of memory sets, wherein the second memory set is different from the first memory set; and
   scheduling the write command for execution to write the data associated with the write command.

10. The machine-implemented method of claim 9, comprising:
    when the scheduled erase command is not pending for the first memory portion, scheduling the write command using the second memory portion in the first memory set, to write the data associated with the write command; and
    when the scheduled erase command is pending for the first memory portion, scheduling the write command using the memory portion in the second memory set, to write the data associated with the write command.

11. The machine-implemented method of claim 8, comprising:
    monitoring the command state of the first memory set when the first memory set is determined to be in the pending command state; and
    scheduling the erase command queued in a wait queue to erase the data stored in the first memory portion, when the command state of the first memory set is changed from the pending command state to an idle command state.

12. The machine-implemented method of claim 8, comprising:
    when the first memory set is determined to be in an idle command state, scheduling the erase command to erase the data stored in the first memory portion.

13. The machine-implemented method of claim 8, wherein determining the command state of the first memory set comprises determining whether a bit corresponding to the first memory set is set in a status data set.

14. The machine-implemented method of claim 8, wherein each memory set of the plurality of memory sets comprises a respective die in a respective one of a plurality of memory channels of the memory, wherein each memory portion of a plurality of memory portions comprises a respective memory block in a respective die.

15. An apparatus, comprising:
means for determining a command state of a first memory set of a plurality of memory sets of a memory, wherein the first memory set comprises a first memory portion;
means for queuing an erase command to erase data stored in the first memory portion of a plurality of memory portions of the memory, when the first memory set is in a pending command state; and
means for scheduling the erase command to erase the data stored in the first memory portion, when a timer for the erase command has expired, and the first memory set remains in the pending command state.

16. The apparatus of claim 15, comprising:
means for assigning a write command to a second memory portion of the plurality of memory portions for writing data associated with the write command, wherein the first memory set comprises the first memory portion and the second memory portion;
when the scheduled erase command is pending for the first memory portion, means for re-assigning the write command to a memory portion in a second memory set of the plurality of memory sets, wherein the second memory set is different from the first memory set; and
means for scheduling the write command for execution to write the data associated with the write command.

17. The apparatus of claim 15, comprising:
means for monitoring the command state of the first memory set when the first memory set is determined to be in the pending command state; and
means for scheduling the erase command queued in a wait queue to erase the data stored in the first memory portion, when the command state of the first memory set is changed from the pending command state to an idle command state.

18. The apparatus of claim 15, comprising:
when the first memory set is determined to be in an idle command state, means for scheduling the erase command to erase the data stored in the first memory portion.

19. The apparatus of claim 18, wherein means for determining the command state of the first memory set comprises means for determining whether a bit corresponding to the first memory set is set in a status data set.

20. The apparatus of claim 15, wherein each memory set of the plurality of memory sets comprises a respective die in a respective one of a plurality of memory channels of the memory, and wherein each memory portion of the plurality of memory portions comprises a respective memory block in a respective die.

* * * * *